(12) United States Patent
Vadhar (10) Patent No.: US 6,716,499 B1
(45) Date of Patent: Apr. 6, 2004

(54) MOISTURE/OXYGEN BARRIER BAG

(75) Inventor: Parimal M. Vadhar, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/589,785

(22) Filed: Jun. 8, 2000

(51) Int. Cl.[7] .............................................. B32B 27/30
(52) U.S. Cl. ................... 428/35.3; 428/35.4; 428/35.7; 428/349; 428/457; 428/461; 428/463; 428/516; 428/520
(58) Field of Search .............................. 428/35.3, 35.4, 428/349, 457, 461, 463, 516, 520, 35.7

(56) References Cited

U.S. PATENT DOCUMENTS

| | | | |
|---|---|---|---|
| 4,064,296 A | 12/1977 | Bornstein et al. ............. | 428/35 |
| 4,120,716 A | 10/1978 | Bonet ........................ | 156/272 |
| 4,601,930 A | 7/1986 | Engelsberger ............... | 428/36 |
| 4,663,218 A | 5/1987 | Akao ........................ | 428/212 |
| 4,780,357 A | * 10/1988 | Akao ........................ | 428/216 |
| 4,937,113 A | 6/1990 | Engelsberger ............. | 428/35.3 |
| 4,978,572 A | 12/1990 | Akao ........................ | 428/323 |
| 5,089,347 A | 2/1992 | Hart ......................... | 428/461 |
| 5,118,563 A | * 6/1992 | Akao ........................ | 428/334 |
| 5,312,659 A | 5/1994 | Otsuka et al. ............. | 428/35.2 |
| 5,374,459 A | 12/1994 | Mumpower et al. ........ | 428/36.7 |
| 5,542,529 A | 8/1996 | Hein, III et al. ............. | 206/245 |
| 5,698,317 A | 12/1997 | Kurokawa et al. .......... | 428/349 |
| 5,827,615 A | 10/1998 | Touhsaent et al. .......... | 428/463 |
| 5,846,620 A | * 12/1998 | Compton .................... | 428/35.7 |
| 5,971,613 A | 10/1999 | Bell ........................... | 383/107 |
| 6,013,353 A | 1/2000 | Touhsaent ................... | 428/203 |
| 6,302,027 B1 | * 10/2001 | Compton et al. ........... | 102/323 |
| 6,333,061 B1 | * 12/2001 | Vadhar ....................... | 426/127 |

FOREIGN PATENT DOCUMENTS

| DE | 41 01 367 | 1/1991 |
|---|---|---|
| GB | 2210899 A | 6/1989 |

* cited by examiner

Primary Examiner—Sandra M. Nolan (57) ABSTRACT

A three-component laminate is disclosed which may be formed into bags and pouches suitable for packaging a variety of moisture and oxygen sensitive products, particularly dry-flow products such as resin pellets, pet food and coffee. The first component is an oriented, multilayer sealant film having an outermost layer which is sealable to itself and to the outermost surface of the third component. The second component, which is disposed between the first component and the third component, is a metallized film. The resulting laminate and bags formed therefrom exhibit excellent moisture and gas barrier properties, excellent abuse resistance and reduced package failure as compared to foil-based packages.

18 Claims, 5 Drawing Sheets

MOISTURE/OXYGEN BARRIER BAG

FIELD OF THE INVENTION

The present invention relates to an article comprising a multilayer film suitable for packaging end use, especially a multilayer film suitable for use in the packaging of moisture and oxygen sensitive products, particularly moisture and oxygen sensitive granular and/or powdered bulk products, such as plastic resin pellets, chemical additives, coffee, or dry pet food. The multilayer film is a laminate of three components wherein the first component comprises an oriented film, and the second component, which is between the first component and the third component, comprises a metallized film. The exposed first component surface is heat-sealable to both itself (end sealable) and the third component surface (lap sealable) while the exposed third component surface is heat-sealable to itself (gusset seal) as well as to the first component (lap sealable). The article preferably comprises a heat seal of the film to itself or another film. The external surface of the article comprises a film layer having a high coefficient of friction in order to improve stackability of the articles. The present invention also relates to packaged products in which the package comprises the article of the invention.

BACKGROUND OF THE INVENTION

A variety of moisture, light and/or oxygen sensitive products are packaged in foil-based bags or pouches. Metal foil provides excellent gas and moisture barrier properties. However, even when laminated to paper or a plastic web, foil is subject to flex cracking and pinholing during normal handling. The poor abuse resistance of a foil-based structure can quickly obviate the initial low permeability. In order to avoid package failure, a variety of oxygen and moisture sensitive resin pellets often are packaged in foil-based bags formed by a tuber process. By such process a paper/foil laminate or a plastic/foil laminate is attached with glue at limited, preselected intervals to an outer, plastic web. Thus, failure of the inner foil-based wall of the bag does not always result in failure of the outer wall. However, these multiwalled structures are necessarily thick, typically at least 12 to 20 mils, and the outer wall "safety net" does not possess moisture and gas barrier properties on the order of those of the foil-based wall, such that failure of the foil-based laminate results in reduction of such properties for the overall bag.

Similarly, there are a variety of photographic products, such as undeveloped photographic film and motion picture rolls, which have for some time been vacuum packaged in opaque, high gas-barrier films. One such film has been a multilayer film having the structure:

polyethylene/foil/nylon/polyethylene terephthalate
However, it would be desirable to provide an alternative film which exhibits a high gas-barrier but which does not contain foil.

A variety of metallized films are known in the art. Typically such films are formed by depositing a thin layer of a metal, most typically aluminum, onto a thermoplastic substrate by a process such as vacuum deposition, vapor deposition or sputtering. Many metallized films include a sealant layer. Although metallized films provide excellent moisture and oxygen barrier properties and are pliable, such that they are resistant to flex cracking and pinholing, there remains a need in the art for such a film which is capable of forming a variety of types of seals and which has sufficient mechanical strength to accommodate large quantities of dry flow product in a bulky, heavy mass.

SUMMARY OF THE INVENTION

Accordingly, in a first aspect the present invention is directed to a multilayer laminate which includes an oriented sealant film having at least one layer and comprising a first outermost layer of the laminate, wherein the first outermost laminate layer is at least one member selected from the group consisting of polyethylene homopolymer, ethylene/alpha-olefin copolymer, ethylene/ester copolymer, ionomer, copolyamide, propylene copolymer and styrene-butadiene copolymer; a core barrier metallized film which includes a polymeric substrate which is a member selected from the group consisting of polyester, polypropylene, high density polyethylene, and nylon, and a continuous layer of a metal disposed on the polymeric substrate; and an outer film having at least one layer and comprising a second outermost layer of the laminate, wherein the second outermost laminate layer is at least one member selected from the group consisting of polyethylene homopolymer, ethylene/alpha-olefin copolymer, ethylene/ester copolymer, ionomer, copolyamide, propylene copolymer and styrene-butadiene copolymer and wherein the laminate has a moisture vapor transmission rate of less than about 0.1 g/100 sq. in. and an instrumented impact strength of at least 2.0 Joules.

In a preferred embodiment the present invention is directed to a multilayer laminate which includes an oriented sealant film having at least a first layer of polyethylene homopolymer, ethylene/alpha-olefin copolymer, ethylene/ester copolymer, ionomer, copolyamide, propylene copolymer or styrene-butadiene copolymer;

a second layer of ethylene/ester copolymer, modified polyolefin, ionomer, ethylene acrylate copolymer, or ethylene (meth)acrylic acid;

a third layer of ethylene/ester copolymer, modified polyolefin, ionomer, ethylene acrylate copolymer, or ethylene (meth)acrylic acid; and a fourth layer of polyethylene homopolymer, ethylene/alpha-olefin copolymer, ethylene/ester copolymer, ionomer, copolyamide, propylene copolymer or styrene-butadiene copolymer;

a core barrier metallized film having a polymeric substrate of polyester, polypropylene, high density polyethylene, or nylon; and a continuous layer of a metal disposed on the polymeric substrate; and an outer film having at least one layer and including an outermost layer of the laminate, where the outermost laminate layer is polyethylene homopolymer, ethylene/alpha-olefin copolymer, ethylene/ester copolymer, ionomer, copolyamide, propylene copolymer or styrene-butadiene copolymer.

Preferably, the laminate includes an adhesive disposed between the sealant film and the core barrier film and an adhesive disposed between the outer film and the core barrier film. Optionally, the laminate may include more than one barrier metallized film. Preferably, the laminate has a total thickness of from about 3.0 to about 15.0 mils.

In a preferred embodiment the polymeric substrate of the core barrier metallized film is polyester. In a more preferred embodiment the core barrier metallized film also includes a layer of polyethylene naphthalate. It is preferred that the metal of the metallized film is aluminum.

Optionally, the oriented sealant film may include a pigment.

In a second aspect, the present invention is directed to a moisture and oxygen barrier bag formed of the laminate of the present invention. As the outermost layer of the sealant film is sealable both to itself and to the outermost layer of the outer film and as the outermost layer of the outer film is sealable both to itself and to the outermost layer of the sealant film both lap seals (inside to outside) and fin seals (inside to inside and outside to outside) may be formed. Thus, the bag may include a variety of seal types including gusset seals.

Optionally, the outer film may include reverse printing on the surface adjacent the adhesive, i.e. the surface opposite to the outermost surface.

DEFINITIONS

As used herein, the terms "lamination," "laminate," as well as the phrase "laminated film," refer to the process, and resulting product, made by bonding together two or more layers of film or other materials. Lamination can be accomplished by joining layers with adhesives, joining with heat and pressure, with corona treatment, and even spread coating and extrusion coating. Lamination is described in U.S. Pat. No. 5,374,459, to Mumpower et al. Lamination can be carried out by the application of polyurethane or other conventional lamination adhesive to either or both of the substrate films. Bonding is accomplished by techniques well known in the lamination art. Preferably, laminates of the present invention have a thickness of 15 mils or less. As used herein, the term "package" refers to packaging materials configured around a product being packaged. The phrase "packaged product," as used herein, refers to the combination of a product which is surrounded by a packaging material.

As used herein, the term "film" is used in a generic sense to include plastic web, regardless of whether it is film or sheet. Preferably, films of and used in the present invention have a thickness of 10 mils or less.

As used herein, the term "seal" refers to any seal of a first region of an outer film surface to a second region of an outer film surface, wherein the seal is formed by heating the regions to at least their respective seal initiation temperatures. The sealing can be performed by any one or more of a wide variety of manners, such as using a heat seal technique (e.g., melt-bead sealing, thermal sealing, impulse sealing, dielectric sealing, radio frequency sealing, ultrasonic sealing, hot air, hot wire, infrared radiation, etc.).

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." As used herein, the phrase "total orientation" refers to the sum of the orientation in the longitudinal direction (machine direction) plus orientation in the transverse direction. In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymer, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of, for example, anhydride-modified polymers such as anhydride-modified LLDPE, anhydride-modified EVA, etc., such polymer being prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer, as well as modified polymers made by derivitization of a polymer after its polymerization. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

The term "ionomer", as used herein, refers to a product of an ionic polymerization, i.e., a polymer containing interchain ionic bonding. Preferably, the ionomer comprises at least one member selected from the group consisting of a thermoplastic resin based on metal salt of an alkene/acid copolymer; more preferably, a thermoplastic resin based on metal salt of ethylene/acid copolymer; still more preferably, metal salt of ethylene/methacrylic acid copolymer. As used herein, the term "ionomer" also includes ethylene/acrylic acid copolymer and ethylene/acid/acrylate terpolymer. As used herein, the phrase "(meth)acrylic acid" refers to both acrylic acid and/or methacrylic acid.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die. Moreover, an outside layer has an "inside surface" and an "outside surface," the inside surface being that surface of the outside layer which is adhered to another film layer, and the outside surface of the outside layer being that surface which is not adhered to another film layer.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin (e.g., linear low density polyethylene, very low density polyethylene, homogeneous polymers such as metallocene catalyzed ethylene/alpha-olefin copolymer, etc.), polyamide, polyester (e.g., polyethylene terephthalate glycol), ethylene/ester copolymer (e.g., ethylene/vinyl acetate copolymer), ionomer, etc.

As used herein, the phrase "heat seal" refers to joint between a film and another object, preferably another film, via any one or more of a number of means for sealing through the use of heat, including thermal sealing, melt bead sealing, impulse sealing, dielectric sealing, ultrasonic sealing, etc.

As used herein, the phrases "heat-shrinkable," "heat-shrink" and the like refer to the tendency of a film, generally an oriented film, to shrink upon the application of heat, i.e., to contract upon being heated, such that the size (area) of the film decreases while the film is in an unrestrained state decreases. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained).

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm ×10 cm specimen of film, when shrunk at 180° F., with the quantitative determination being carried out according to ASTM D 2732, as set forth in the 1990 *Annual Book of ASTM Standards*, Vol. 08.02, pp. 368–371, which is hereby incorporated, in its entirety, by reference thereto.

DETAILED DESCRIPTION OF THE INVENTION

The present invention is directed to a three-component laminate having a general A/B/C structure wherein A is an oriented film, B is a metallized film, and C is a film having at least one layer and including an outermost layer which is sealable to the outermost layer of component film A. Additionally, the outermost layer of component film A is sealable to itself such that the laminate is capable of forming "in/in" seals, known as fin seals. Moreover, the outermost layer of component film C also is sealable to itself such that the laminate is capable of forming "out/out" seals as would be required for certain types of gusset seals, discussed in greater detail below.

Most preferably, the oriented film of component A is an at least four layer film which has been formed by coextruding a two layer film and collapsing the structure such that the second and third layers, i.e., the innermost layers, self-weld. Such self-welded films have been found to exhibit improved impact strength and abuse resistance as compared to similar films having the same number of layers which are not self-welded. The means by which such self-welding is achieved is discussed in greater detail below.

Component B is a metallized film such as is well known in the art. Examples of metallized films suitable for use in the present invention include the HB Laminate supplied by Rexam Metallising in Thetford, UK, a laminate of two metallized polyethylene terephthalate films and a polyethylene-based sealant; Oppalyte 35MU842, an aluminum metallized oriented polypropylene film including a sealable layer, supplied by Mobil Chemical Co., Macedon, N.Y. Most preferred for use in accordance with the present invention is a coextruded polyethylene terephthalate (PET)/polyethylene naphthalate (PEN) substrate metallized by vacuum deposition with an aluminum metal layer. The substrate is sold by Mitsubishi, Wiesbaden, Germany (formerly Hoechst Diafoil) under the tradename RHB12 and is metallized by Rexam Metallising and sold under the tradename Campak 3800. Other metallized films which may be employed in accordance with the present invention include a 0.50 mil aluminum metallized biaxially oriented polypropylene sold under the trade designation MLB by Applied Extrusion Technologies of New Castle, DE; an aluminum metallized polyethylene terephthalate sold under the tradename Melinex D841 by DuPont; and an aluminum metallized biaxially oriented polypropylene sold by Toray.

Generally, such metallized films are formed by depositing a thin, continuous layer of a metal onto a relatively stiff polymeric film substrate. Preferred substrates include polyesters such as polyethylene terephthalate (PET) and other high modulus materials such as polypropylene, high density polyethylene (HDPE), and nylon. Preferably, the substrate film is biaxially oriented and subsequently heat set. Biaxial orientation improves physical and barrier properties. Heat setting provides a dimensionally stable film. However, for purposes of the present invention any polymeric material which is capable of supporting a metal layer and which is capable of adhering to at least one of outer film components A or B may be employed as the present metallized film substrate. Similarly, although aluminum is the presently preferred metal being employed by the current metallized film suppliers, other metals may be employed which are capable of being deposited onto a polymeric substrate and formed into a laminate in accordance with the present invention and which provide the desired moisture vapor and oxygen transmission properties.

Component C is a monolayer or multilayer film which includes an outermost layer which is sealable to the outermost layer of component film A. In the case of some metallized films which include a sealable layer, such as the HB Laminate supplied by Rexam Metallising, discussed above, the sealable layer of such film may serve as component C so long as the sealable surface is sealable to the outermost surface of component film A. It is also within the scope of the present invention that component C may be extrusion coated onto the metallized film. However, most preferably, component C is a separate monolayer or multilayer film which is laminated to the metallized film. As such, it may be advantageously reverse printed on the surface which is laminated to the metallized film for forming a desirable bag or other package. It is also preferred that the film of component C is a non-oriented, non-heat-shrinkable film. Thus, the overall laminate may benefit from the combined physical properties of the oriented film of component A and the non-oriented film of component C. However, in a less preferred embodiment the film of component C may be an oriented film. As such, it is preferred that the oriented film is heat set in order to render it non-heat-shrinkable.

By combining an oriented film, a metallized film and, preferably, a non-oriented film, a unique set of properties are obtainable. The present laminate has a moisture vapor transmission rate of less than about 0.1 g/100 in.$^2$, preferably less than about 0.05 g/100 in.$^2$, and most preferably less than about 0.03 g/100 in.$^2$. Such low moisture vapor transmission rates are fairly typical for metallized films and multilayer composites containing metallized films or foils. However, the present laminate has an instrumented impact strength with an average energy to break of at least 2 Joules, preferably from about 3 to about 10 Joules, more preferably from about 4 to about 9 Joules, and most preferably from about 5 to about 8 Joules. Similarly, the present laminate has a tensile strength at break of from about 6,000 to about 15,000 psi, preferably from about 7,000 to about 14,000 psi, and most preferably from about 8,000 to about 12,000 psi. Such excellent physical properties are not found in typical metallized film—or foil-based structures. Furthermore, the present laminate possesses excellent tear propogation properties which allow for an easy open feature in the final package. Such properties are not found in foil-based structures or in packages formed by a tuber process.

Additionally, the present laminate preferably possesses a high coefficient of friction (COF) such that packages formed in accordance with the present invention may be easily stacked. Such high COF is achieved by employing sufficient antiblock in the outermost layer of component C to prevent blocking during wind-up but, preferably, no waxes or other slip additives.

The multilayer laminate of the present invention has at least 4 layers; that is, at one layer of an oriented film (component A), at least one layer of a substrate of a metallized film, at least one metal layer, and at least one outer component C layer. If the adhesive employed during lamination is considered to be a separate laminate layer, then the laminate must have at least five layers as oriented film component A is necessarily laminated to the metallized film but component C may be disposed on the metallized film by another method, such as extrusion coating, discussed above. Thus, preferably the present laminate possesses from 4 to 20 layers, more preferably from 7 to 11 layers. However, so long as the multilayer laminate has at least 4 layers, the multilayer laminate can have any further number of additional layers desired, so long as the film provides the desired properties for the particular packaging operation in which the film is used, e.g. $O_2$-barrier characteristics, free shrink, shrink tension, optics, modulus, seal strength, etc. Thus, 4, 5, 6, 7, 8, 9, 10, 11, 12, 13, 14, 15, 16, 17, 18, 19, 20 and more layers are all within the scope of the present invention.

The multilayer laminate used in the present invention can have any total thickness desired, so long as the film provides the desired properties for the particular packaging operation in which the film is used. Preferably, the film has a total thickness of less than about 20 mils, more preferably the film has a total thickness of from about 3 to 20 mils, and still more preferably from about 3 to 15 mils.

Optionally, but preferably, one or more of the films of the laminate of the present invention is irradiated to induce cross-linking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Van de Graaf generator or resonating transformer may be used. The radiation is not limited to electrons from an accelerator since any ionizing radiation may be used. The ionizing radiation can be used to crosslink the polymers in the film. Preferably, the film is irradiated at a level of from 0.5–15 MR (5–150 kGy), more preferably 1–8 MR (10–80 kGy), still more preferably, about 3 to 5 MR (30–50 kGy). As can be seen from the descriptions of preferred films for use in the present invention, the most preferred amount of radiation is dependent upon the film composition, thickness, etc., and its end use. Chemical crosslinking can also be utilized, together with electronic crosslinking, or in place of electronic crosslinking.

Also within the scope of the present invention is the corona treatment of a film which is performed by subjecting the surfaces of the film to corona discharge, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface.

As is known to those of skill in the art, various polymer modifiers may be incorporated for the purpose of improving toughness and/or orientability or extensibility of the film. Other modifiers which may be added include: modifiers which improve low temperature toughness or impact strength, and modifiers which increase modulus or stiffness. Exemplary modifiers include: styrene-butadiene, styrene-isoprene, and ethylene-propylene.

Figure 1:
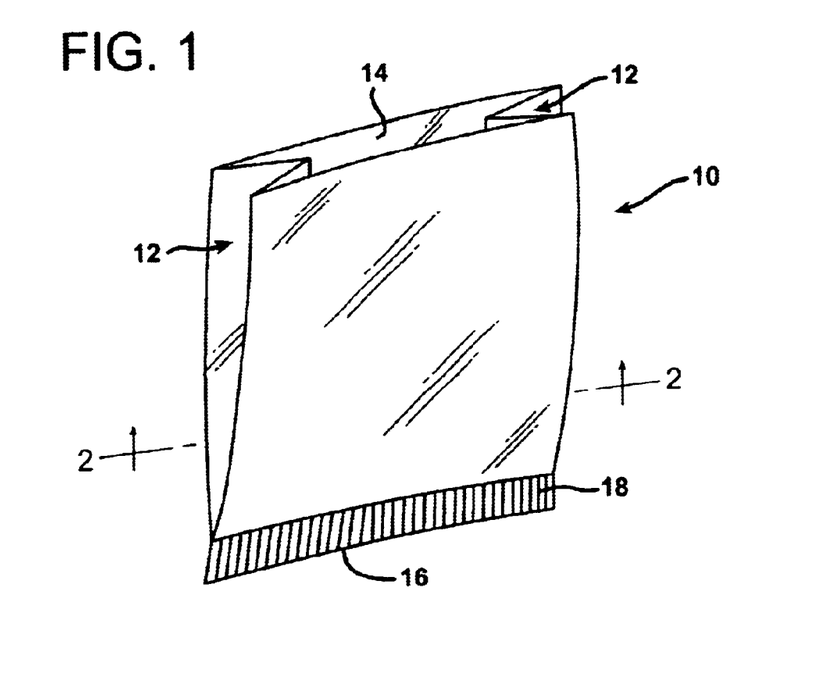
FIG. 1 illustrates a perspective view of a side-gusseted bag in accordance with the present invention.
Figure 2A:
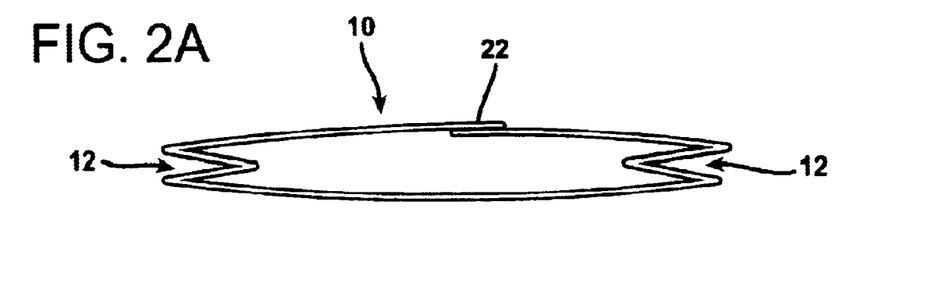
FIG. 2A illustrates a cross-sectional view of a first embodiment of the side-gusseted bag illustrated in FIG. 1.
Figure 2B:
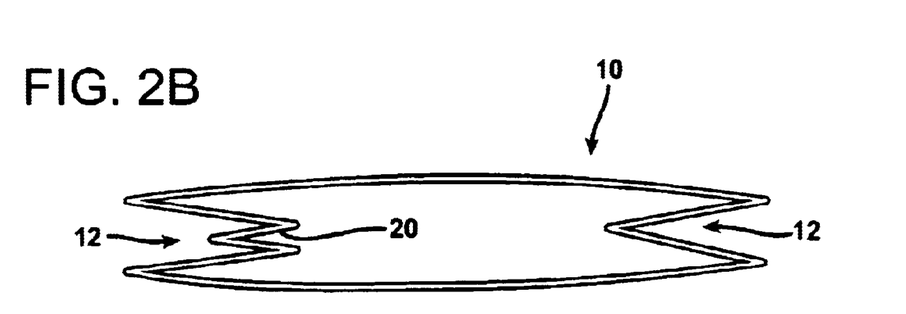
FIG. 2B illustrates a cross-sectional view of a second embodiment of the side-gusseted bag of FIG. 1.

FIG. 1 illustrates a perspective view of gusseted bag 10 in accordance with the present invention. Gusseted bag 10 has side gussets 12, open top 14, bottom edge 16, and seal region 18. FIGS. 2A and 2B illustrate two possible cross-sectional views taken through section 2—2 of FIG. 1. FIG. 2A illustrates a tubular cross-sectional view of gusseted bag 10, including side gussets 12 and lap seal 22. FIG. 2B illustrates a tubular cross-section of gusseted bag 10, including side gussets 12 and side-seal 20 (a fin seal).

Figure 3:
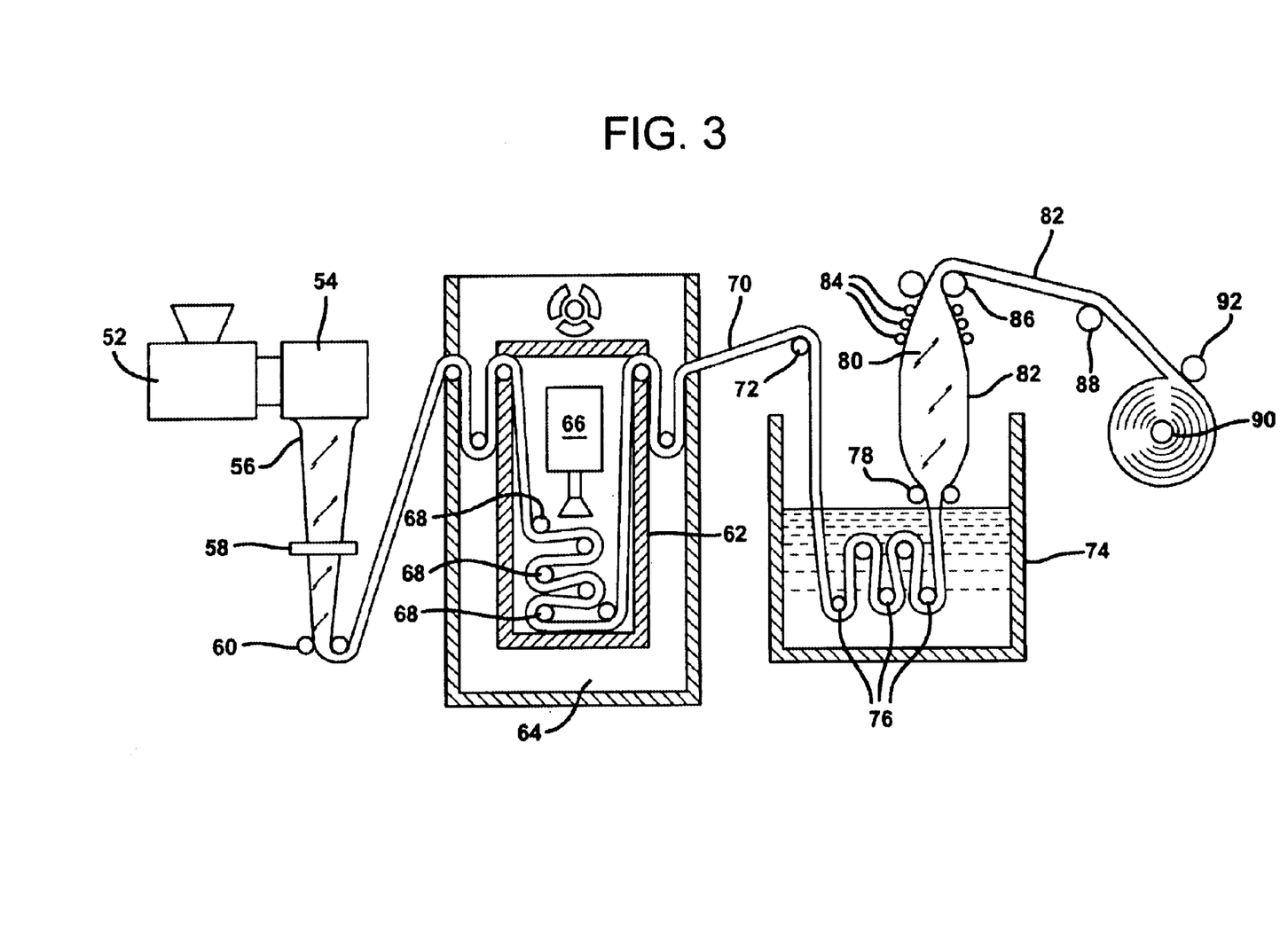
FIG. 3 illustrates a schematic view of a process for producing an oriented film in accordance with the present invention.

FIG. 3 illustrates a schematic of a preferred process for producing oriented multilayer films suitable for use in the article of the present invention, e.g., first component films. In the process illustrated in FIG. 3, solid polymer pellets (not illustrated) are fed to a plurality of extruders 52 (for simplicity, only one extruder is illustrated). Inside extruders 52, the polymer pellets are forwarded, melted, and degassed, following which the resulting bubble-free melt is forwarded into die head 54, and extruded through annular die, resulting in tubing 56 which is 5–40 mils thick, more preferably 20–30 mils thick, still more preferably, about 25 mils thick. In order to prevent the inner layers of the tape from self-adhering, the inside surface of the tubular tape was coated with powdered cornstarch.

After cooling or quenching by water spray from cooling ring 58, tubing 56 is collapsed by pinch rolls 60, and is thereafter fed through irradiation vault 62 surrounded by shielding 64, where tubing 56 is irradiated with high energy electrons (i.e., ionizing radiation) from iron core transformer accelerator 66. Tubing 56 is guided through irradiation vault 62 on rolls 68. Preferably, the irradiation of tubing 56 is at a level of from about 2 to 10 megarads (hereinafter "MR").

After irradiation, irradiated tubing 70 is directed over guide roll 72. The now collapsed irradiated tubing 70 is heated in oven by a plurality of steam rolls 76 around which the tubing is partially wound, and optional hot air blowers, elevate the temperature of tubing 70 to a desired orientation temperature of from about 230° F.–260° F. Thereafter, film 70 is directed through nip rolls 78, and bubble 80 is blown, thereby transversely stretching tubing 70. Furthermore, while being blown, i.e., transversely stretched, irradiated film 70 is drawn (i.e., in the longitudinal direction) between nip rolls 78 and nip rolls 86, as nip rolls 86 have a higher surface speed than the surface speed of nip rolls 78. As a result of the transverse stretching and longitudinal drawing, biaxially-oriented, film 82 is produced, this film preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 80 is maintained between pinch rolls 78 and 86, tubing 82 is collapsed by rolls 84, and thereafter conveyed through pinch rolls 86 and across guide roll 88, and then rolled onto wind-up roller 90. Idler roll 92 assures a good wind-up. For purposes of the present invention, it is preferred that the inner surface is allowed to self-weld. Inflation of the tape for orientation sufficiently reduces the concentration of cornstarch to allow for self-welding.

Figure 4:
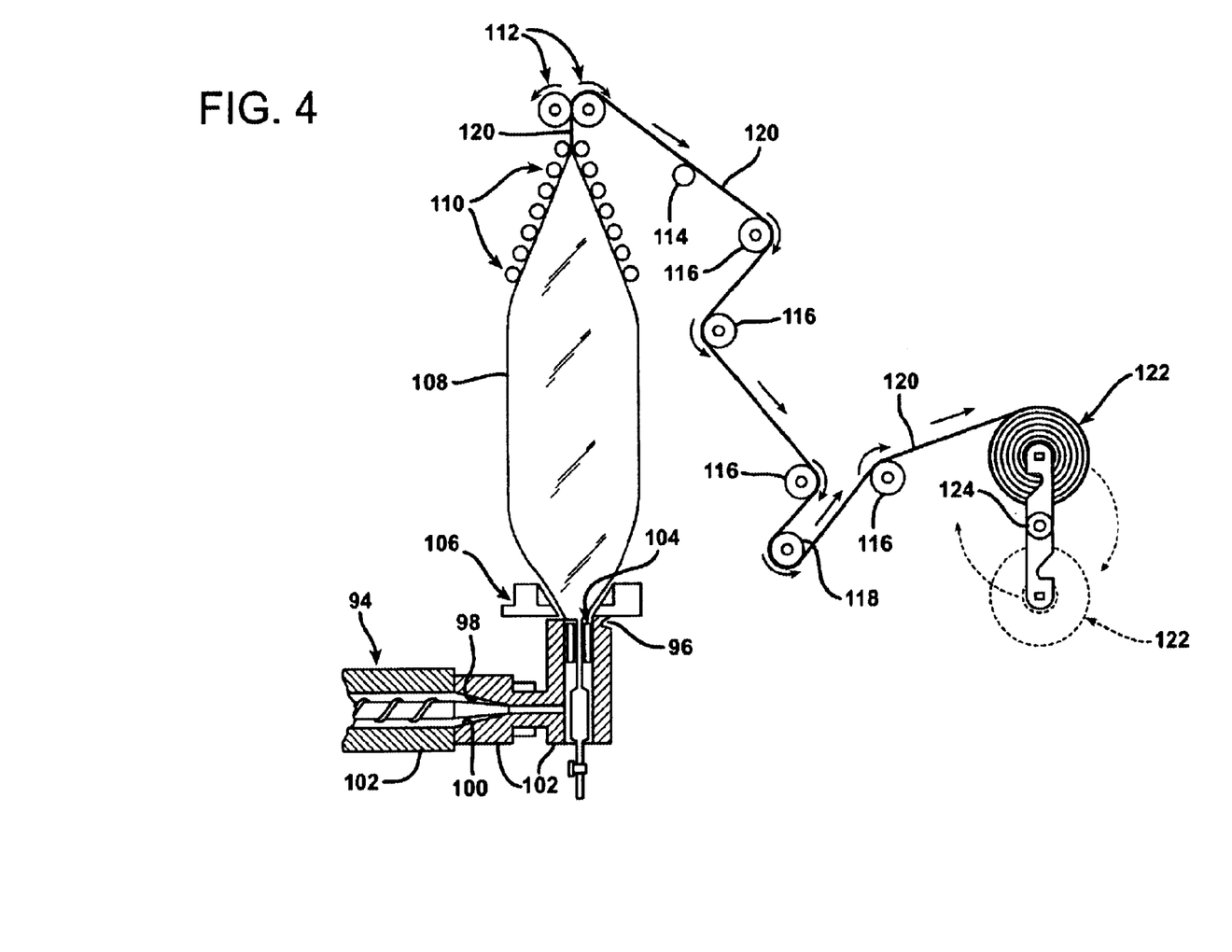
FIG. 4 illustrates a schematic view of an upward blowing process for making a non-oriented film in accordance with the present invention.
Figure 5:
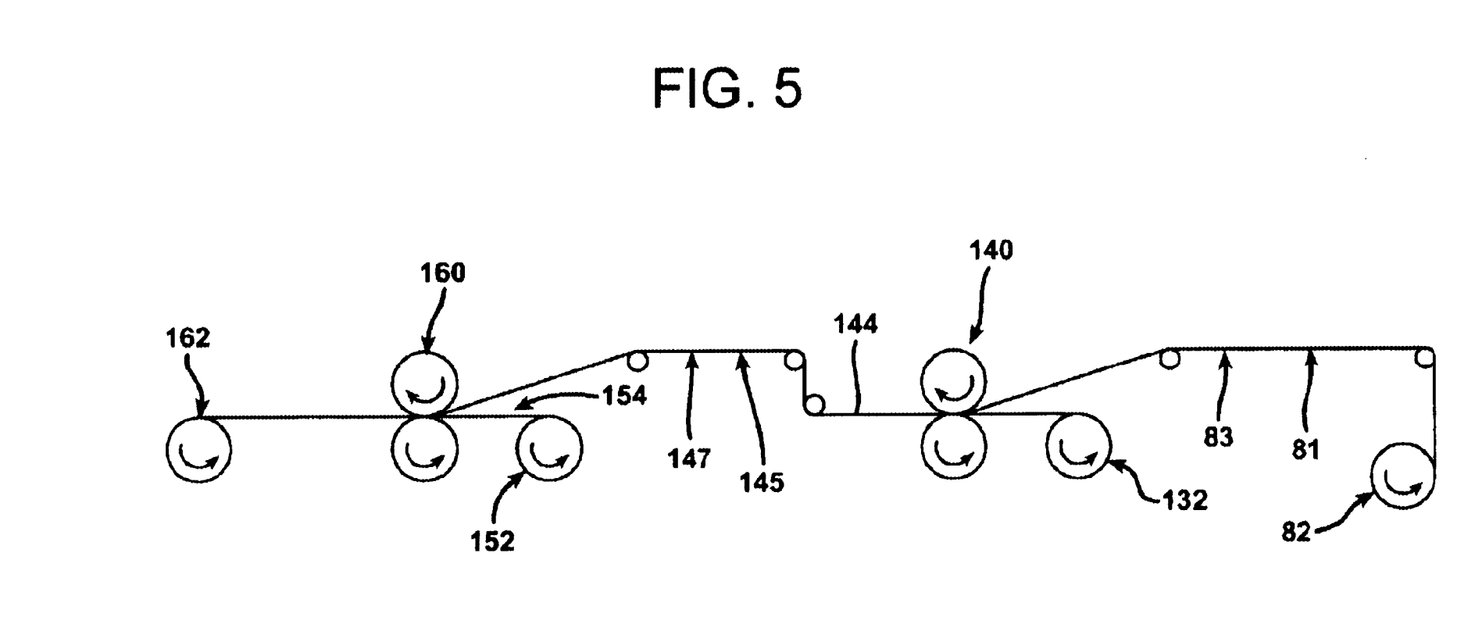
FIG. 5 illustrates a schematic view of a lamination process for use in accordance with the present invention.

FIG. 4 illustrates a schematic view of another process for making non-oreinted film for use in the article according to the present invention, and is especially suitable for preparing non-heat-shrinkable film as is preferred for component C. Although for the sake of simplicity only one extruder 94 is illustrated in FIG. 5, others may be employed for multilayer structures. However, a monolayer film is suitable for use as the component C film of the present multilayer laminate. Each of the extruders employed is supplied with polymer pellets suitable for the formation of the respective layer it is extruding. The extruders subject the polymer pellets to sufficient pressure and heat to melt the polymer and thereby prepare it for extrusion through a die.

Taking extruder 94 as an example, each of the extruders is preferably equipped with a screen pack 98, a breaker plate 100, and a plurality of heaters 102. Each of the coextruded film layers is extruded between mandrel 104 and die 96, and the extrudate is cooled by cool air flowing from air ring 106.

The resulting blown bubble, which is oriented at or near melt temperature, is thereafter guided into a collapsed configuration by nip rolls 112, via guide rolls 110. The collapsed tube is optionally passed over treater bar 114, and is thereafter passed over idler rolls 116, and around dancer roll 118 which imparts tension control to collapsed tube 120, after which the collapsed tube is wound into roll 122 via winding mechanism 124.

FIG. 5 illustrates a schematic view of a preferred lamination process in accordance with the present invention. A first surface of oriented component film A, from roll 82, is corona treated (81). Thereafter, the laminating adhesive is applied (83) to the corona treated surface of the film and allowed to dry. Metallized component film B from roll 132 is fed, along with component film A, to first laminator 140 with the metal surface of the metallized film facing the corona treated surface of film A. A preliminary laminate 144 is formed. The exposed metallized film substrate surface of preliminary laminate 144 is then corona treated (145) and adhesive is applied (147) and allowed to dry. A first surface of component film C from roll 152 is corona treated (154) and fed, along with preliminary laminate 144, to second laminator 160 with the two corona treated surfaces facing each other. The final laminate is wound into roll 162. In such a lamination process employing two laminators, either of components films A or C may be laminated to core metallized component film B in a first pass followed by lamination of the other film to the opposite surface of the core metallized film in a second pass. Preferably, oriented component film A is first laminated to the metal side of the core metallized film in a first pass in order to trap the metal surface and preclude subsequent scratching. Component film C, which is most preferably reverse printed, is then laminated on its printed side to the outer substrate surface of the core metallized film. It should be noted that when component film C is reverse printed, it has necessarily been corona treated prior to printing such that subsequent corona treatment, prior to lamination, is not required. It is also within the scope of the present invention to first laminate component film C to core component film B in a first pass and then laminate component film A to the opposite surface of component film B in a second pass. When only a single laminator is available the first two components may be laminated to each other in a first batch and then laminated to the third component in a second batch. Also within the scope of the present invention is a single-pass, triplex lamination process whereby all three components are fed to a single, specially designed, laminator and simultaneously laminated in one step.

Figure 6:
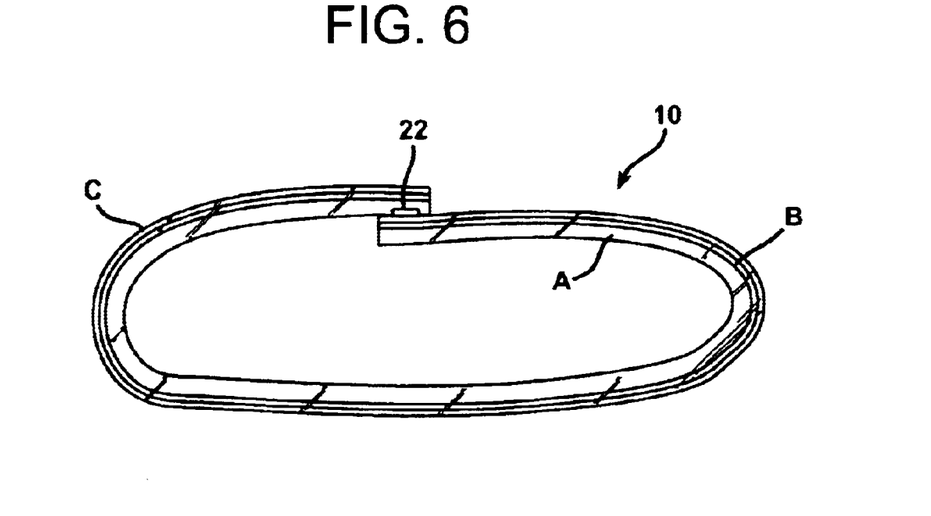
FIG. 6 illustrates a cross-sectional view of a bag in accordance with the present invention showing an inside to outside lap seal.

FIG. 6, is a cross-sectional view of gusseted bag 10 illustrated in FIG. 2A. Lap seal 22 is formed by heat sealing component film A to component film B.

Figure 7:
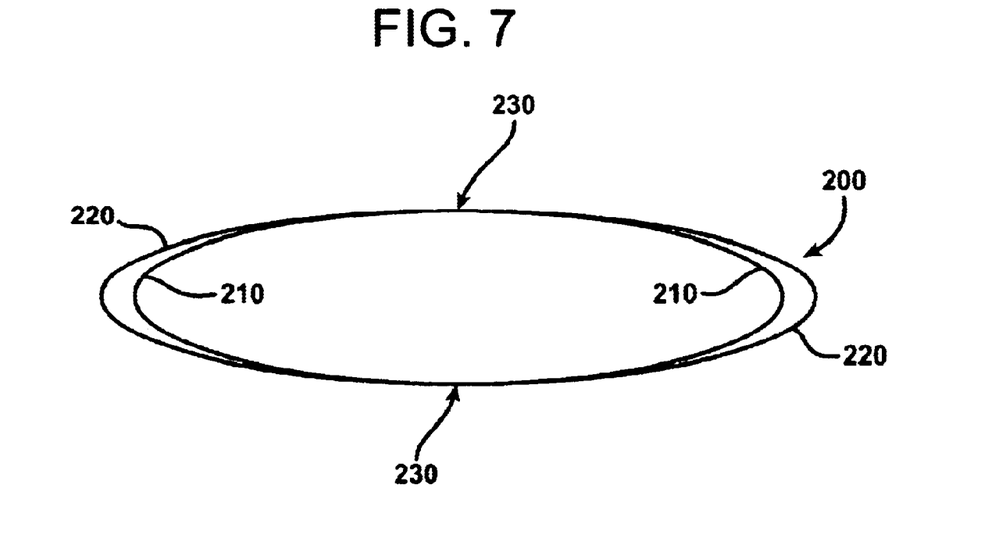
FIG. 7 illustrates a cross-sectional view of a competitive bag.

FIG. 7 illustrates a cross-sectional view of a competitive bag 200 made by a tuber process. Inner wall 210 is a laminate of a film and a foil. Outer wall 220 is a film or paper. Inner wall 210 is attached to outer wall 220 by strips of glue 230 applied at preselected intervals.

Various films suitable in accordance with the present invention are described below. Unless stated otherwise, all percentages, parts, etc. are by weight. The following tests were performed in evaluating laminates in accordance with the present invention and competitive materials.

Tensile properties, including tensile strength, elongation at break, and modulus were measured in accordance with ASTM D882 whereby a sample of film is uniaxially deformed to the point of breakage.

Instrumented impact was measured in accordance with ASTM D3763 whereby a sample of film is struck to determine the energy require to deform and initiate fracture.

Seal strength was measured by peeling apart two strips of film which have been sealed together on an Instron tensile tester.

Tear properties were measured in accordance with ASTM D1938 which measures the force required to sustain a tear along a slit in the film.

Oxygen transmission rate was measured in accordance with ASTM D3985 whereby one side of a film sample was exposed to oxygen under controlled conditions and the steady-state transmission rate is measured at the opposite surface of the film.

Moisture vapor transmission rate was measured in accordance with ASTM F1249 whereby one side of a film sample was exposed to moisture vapor under controlled conditions and the steady-state transmission rate is measured at the opposite surface of the film.

Wetting tension was measured in accordance with ASTM D2578 whereby drops of specific test solutions are applied to the surface of the film in the presence of air. Wetting tension is an indication of the degree of corona treatment.

EXAMPLES

Example 1

The preparation of a three-component laminate in accordance with the present invention was performed as follows.

A multilayer, oriented film was prepared using the process illustrated in FIG. 6, discussed above, by casting a solid tape using an annular coextrusion die. The tape outer layer was a blend of 80% SCLAIR 11C1, a linear low density polyethylene having a density of 0.917 g/cc and a melt index of 0.80, supplied by Nova Chemicals and 20% of concentrate no. 110858 supplied by Ampacet Corporation, Tarrytown, New York, which is about 50% titanium dioxide in a low density polyethylene carrier. The tape inner layer was Escorene LD-761.36, an ethylene vinyl acetate copolymer having 28% vinyl acetate, a density of 0.950 g/cc, and a melt index of 5.7, supplied by Exxon Chemical Company, Houston, Tex. In order to prevent the inner layers of the tape from self-adhering, the inside surface of the tubular tape was coated with powdered cornstarch. The tape was irradiated at 4.0 megarads. The tubular tape was flattened and reheated to 240° F. in an oven, and blown into a bubble. The bubble was expanded to about 3.6 times its original dimensions in both the machine and transverse directions. The collapsed and flattened tubing adhered to itself because the expansion of the film reduced the concentration of the cornstarch to a level low enough for self-welding to occur. Hence, ply separation was not required and a single wound film roll of 4.5 mil white, oriented film was produced.

A non-oriented, monolayer film was produced by the blown bubble process illustrated in FIG. 7, discussed above. Dowlex 2078D, a linear low density polyethylene having a density of 0.920 g/cc and an melt index of 1.0 g/10 min., supplied by the Dow Chemical Company, Midland, Mich., was extruded through an annular die and immediately blown into a bubble to produce a 1.00 mil film. The tubular film was slit to produce a clear, monolayer film.

The metallized film supplied by Rexam Metallising and employing the PET/PEN substrate, sold as RHB12 by Mitsubishi, discussed above, was obtained. Aluminum metal had been deposited onto the PEN surface of the 0.50 mil coextruded substrate to an optical density of at least The white, oriented film was corona treated on one surface thereof to obtain surface treatment of at least 42 dynes. Subsequently, the white, oriented film was laminated to the metallized film with a solvent-based laminating adhesive and with the corona treated surface of the oriented film being adhered to the metal surface of the metallized film. The solvent-based adhesive employed was obtained from Rohm & Haas, Woodstock, Ill., and consisted of 46.7% Adcote 532A, a polyester urethane, 9.4% Adcote 532B, a catalyst, and 43.9% ethyl acetate. The adhesive had a thickness of 0.20 mil.

Thereafter, a surface of the monolayer film was similarly corona treated to at least 42 dynes and laminated to the PET surface of the metallized film with the same Rohm & Haas adhesive. The adhesive had a thickness of 0.20 mils.

The laminate was slit after 24 hours to allow for full cure of the laminating adhesive.

The slit rolls were then converted into side-gusseted bags.

Example 2

A second three-component laminate in accordance with the present invention was produced by the method set forth in Example 1, above. However, Oppalyte 35 MU842 supplied by Mobil was employed instead of the metallized film obtained from Rexam Metallising employed in Example 1. Oppalyte 35MU842 is an aluminum metallized biaxially oriented polypropylene film which includes a very thin ethylene/propylene copolymer (EPC) sealant layer on the BOPP surface opposite the metal layer. Component film A was laminated to the metal side of the metallized film and component film C was laminated to the EPC layer. The outer EPC layer of the metallized film was not employed as component C of the present laminate because it was determined to be too thin to act as the outer sealant for the entire laminate structure.

Comparative Example 3

A competitive bag was obtained which was made by a tuber process, discussed above, having a cross-sectional construction as shown in FIG. 7. The inner wall was a laminate having the following layer-by-layer structure and layer thicknesses in mils:

| PE/ | adh./ | Al foil/ | adh./ | PE |
|-----|-------|----------|-------|-----|
| 1.9 | 0.7   | 0.28     | 0.7   | 1.9 |

The polyethylene layers included a white concentrate. The outer wall was a single, 5.8 mil layer of polyethylene with a white concentrate. The total thickness for the composite was about 11.2 mils.

Comparative Example 4

A competitive bag was obtained which was made by a tuber process, discussed above, having a cross-sectional construction as shown in FIG. 7. The inner wall of the bag was a foil/polyethylene film laminate with the polyethylene surface forming the innermost, sealable surface of the bag. The outer wall of the bag was paper. The laminate inner wall was adhered to the paper outer wall by a strip coat of adhesive. The overall structure had a total thickness of 20.0 mils. However, even at such a thickness, the instrumented impact strength, i.e., the energy to break, was only 0.16 Joules.

The bags of Example 1 and Comparative Example 3 were tested for physical properties and seal strength. The results are set forth in Table 1, below. For the bag of Comparative Example 3, only the inner wall laminate could be tested for tensile strength and tear propagation since the inner and outer walls are not adhered throughout.

TABLE I

Physical Properties

| Bag of | Gauge (mils) | Tensile Strength @ Break (psi) | Avg. Tear Prop. (gms.) | Impact Strength, Energy to Break (J.) | Seals | Seal Strength - Max. Force (lb. ft.) |
|--------|--------------|-------------------------------|------------------------|---------------------------------------|-------|--------------------------------------|
| Example 1 | 5.97 (MD) 5.84 (TD) | 8,838 10,133 | 236 292 | 5.93 (6.20 mil sample) | Out/Out In/Out In/In | 7.90 17.1 18.3 |
| Comp. Example 3 | 6.01 (MD) 5.68 (TD) | 5,610 3,120 | 876 718 | 1.06 for total structure (12.0 mils) | Out/Out In/Out | 10.0 12.9 20.6 |

The bags of Example 1 and Comparative Example 3 were also tested for moisture vapor transmission rate and oxygen transmission rate. The results which are reported in Table II, below, are actual transmission rates reported in units of g/100 in.$^2$/day at 100° F. and 100% relative humidity and normalized rates, reported in g-mil/100 in.$^2$/day at 100° F. and 100% relative humidity. Dry oxygen transmission is reported in units of cm$^3$/m$^2$ at 77° F. and 0% relative humidity and normalized dry oxygen transmission is reported in units of cm$^3$-mil/m$^2$ at 77° F. and 0% relative humidity. The oxygen transmission rate for the bag of Comparative Example 3 is only reported for the inner wall of the bag since that is the component which contains the oxygen barrier foil. The moisture barrier transmission rate for the bag of Comparative Example 3 is reported for the entire structure as both walls contribute to that bags moisture barrier properties.

TABLE II

Transmission Properties

| Bag of | Gauge (mil) | MVTR | Normalized MVTR | Gauge (mil) | Dry OTR | Normalized OTR |
|--------|-------------|------|-----------------|-------------|---------|----------------|
| Example 1 | 6.35 | 0.03 | 0.19 | 6.30 | <0.20 | 1.26 |
|  | 6.27 | 0.04 | 0.25 | 6.44 | <0.20 | 1.28 |
| Comp. Example 3 | 13.00 | <0.01 | 0.13 | 6.13 | 0.30 | 1.84 |
|  | 13.23 | 0.02 | 0.26 | 6.15 | 0.30 | 1.84 |

Comparative Example 5

A competitive bag was obtained which was a multilayer laminate having the following layer-by-layer composition and layer thicknesses:

| PE (sealant) / | adh. / | nylon 6 / | adh. / | foil / | adh. / | PET |
|----------------|--------|-----------|--------|--------|--------|-----|
| 5.78 / | 0.08 / | 0.52 / | 0.07 / | 0.26 / | 0.09 / | 0.47 |

A 0.08 mil silica-based coating was disposed on the outer PET surface. The total structure had a thickness of 7.35 mils. All of the adhesive layers were a polyurethane adhesive.

Comparative Example 6

A competitive bag was obtained which was a multilayer laminate having the following layer-by-layer composition and layer thicknesses:

| PE (sealant) / | adh. / | nylon 6 / | adh. / | foil / | adh. / | PET |
|---|---|---|---|---|---|---|
| 6.22 / | 0.08 / | 0.52 / | 0.07 / | 0.23 / | 0.1 / | 0.51 |

A 0.12 mil nitrocellulose-based coating was disposed on the outer PET surface. The total structure had a thickness of 7.85 mils.

The bags of Examples 1 and 2 and Comparative Examples 5 and 6 were tested for physical properties and moisture vapor transmission. Tensile strength, elongation at break and tear propagation are reported for both the machine direction and the transverse direction of each film. Differing gauges represent the average gauge for four samples tested for each direction. The laminate of Example 2 was not tested for tensile strength or elongation at break but is expected to display physical properties comparable to those of the laminate of Example 1. The results are set forth in Table III, below.

TABLE III

Physical and Moisture Vapor Transmission Properties

| Bag of | Gauge (mils) | Tensile Strength @ Break (psi) | Elong. @ Break (%) | Impact - Energy to Break (J.) | Avg. Tear Prop. (gms.) | MVTR (g/100 in.$^2$) @ 100° F., 100% RH |
|---|---|---|---|---|---|---|
| Ex. 1 | 5.97 (MD) | 8,838 | 151 | 5.93 | 236 | 0.03 |
|  | 5.84 (TD) | 10,133 | 116 |  | 292 |  |
| Ex. 2 | 6.60 (MD) | Not tested | Not tested | 4.04 | 167 | 0.02 |
|  | 6.64 (TD) |  |  |  | 189 |  |
| Comp. Ex. 5 | 7.77 (MD) | 4950 | 82 | 1.59 | 362 | <0.01 |
|  | 7.74 (TD) | 4920 | 60 |  | 224 |  |
| Comp. Ex. 6 | 7.74 (MD) | 6040 | 71 | 1.98 | 1270 | <0.01 |
|  | 7.86 (TD) | 5460 | 57 |  | 1370 |  |

Although the present invention has been described in connection with the preferred embodiments, it is to be understood that modifications and variations may be utilized without departing from the principles and scope of the invention, as those skilled in the art will readily understand. For example, copending U.S. Ser. No. 09/268,458, hereby incorporated herein by reference, is directed to a packaging article having a seal along one edge thereof, the seal comprising two seals each having a gap therein, thereby forming a vent, which allows air within the package to escape during stacking of the bags on a pallet or other surface. Such venting seal arrangement may advantageously be employed in a packaging article, such as a bag, formed in accordance with the present invention within the scope of the present claims. Accordingly, other such modifications may be practiced within the scope of the following claims. Moreover, Applicants hereby disclose all sub-ranges of all ranges disclosed herein. These sub-ranges are also useful in carrying out the present invention.

What is claimed is:

1. A multilayer laminate comprising:
   an oriented sealant film comprising:
      a first layer comprising at least one member selected from the group consisting of polyethylene homopolymer, ethylene/alpha-olefin copolymer, ethylene/ester copolymer, ionomer, copolyamide, propylene copolymer and styrene-butadiene copolymer, the first layer comprising a first outermost layer of the laminate;
      a second layer adhered to the first layer and comprising at least one member selected from the group consisting of ethylene/ester copolymer, modified polyolefin, ionomer, ethylene acrylate copolymer, and ethylene (meth)acrylic acid copolymer;
      a third layer directly adhered to the second layer and comprising a composition identical to that of the second layer; and
      a fourth layer adhered to the third layer and comprising composition identical to that of the first layer;
   a core barrier metallized film comprising:
      a polymeric substrate comprising a member selected from the group consisting of polyester, polypropylene, high density polyethylene, and nylon; and
   a continuous layer of a metal disposed on
   the polymeric substrate; and
      an outer film comprising at least one layer and comprising a second outermost layer of the laminate, said second outermost laminate layer comprising at least one member selected from the group consisting of polyethylene homopolymer, ethylene/alpha-olefin copolymer, ethylene/ester copolymer, ionomer, copolyamide, propylene copolymer and styrene-butadiene copolymer;
   wherein the laminate has a moisture vapor transmission rate of less than about 0.1 g/100 sq. in., and an instrumented impact strength of at least 2.0 Joules.

2. The laminate set forth in claim 1 further comprising an adhesive disposed between the oriented sealant film and the core barrier film.

3. The laminate set forth in claim 1 further comprising an adhesive disposed between the outer film and the core barrier film.

4. The laminate set forth in claim 1 wherein the laminate has a total thickness of from about 3.0 to about 15.0 mils.

5. The laminate set forth in claim 1 wherein the polymeric substrate of the core barrier metallized film comprises polyester.

6. The laminate set forth in claim 5 wherein the core barrier metallized film further comprises a layer comprising polyethylene naphthalate.

7. The laminate set forth in claim 1 wherein the metal comprises aluminum.

8. The laminate set forth in claim 1 wherein the oriented sealant film comprises a pigment.

9. An oxygen and moisture barrier bag comprising:
   a laminate comprising:
      an oriented sealant film comprising:
         a first layer comprising at least one member selected from the group consisting of polyethylene homopolymer, ethylene/alpha-olefin copolymer, ethylene/ester copolymer, ionomer, copolyamide, propylene copolymer and styrene-butadiene copolymer, the first layer comprising a first outermost layer of the laminate;
         a second layer adhered to the first layer and comprising at least one member selected from the group consisting of ethylene/ester copolymer, modified polyolefin, ionomer, ethylene acrylate copolymer, and ethylene (meth)acrylic acid copolymer;
         a third layer directly adhered to the second layer and comprising a composition identical to that of the second layer; and
         a fourth layer adhered to the third layer and comprising composition identical to that of the first layer;

a core barrier metallized film comprising:
  a polymeric substrate comprising a member selected from the group consisting of polyester, polypropylene, high density polyethylene, and nylon; and
  a continuous layer of a metal disposed on the polymeric substrate; and
an outer film comprising at least one layer and comprising a second outermost layer of the laminate, said second outermost laminate layer comprising at least one member selected from the group consisting of polyethylene homopolymer, ethylene/alpha-olefin copolymer, ethylene/ester copolymer, ionomer, copolyamide, propylene copolymer and styrene-butadiene copolymer;
wherein the laminate is sealed to itself to form a bag.

10. The bag set forth in claim 9 further comprising an adhesive disposed between the oriented sealant film and the core barrier film.

11. The bag set forth in claim 9 further comprising an adhesive disposed between the outer film and the core barrier film.

12. The bag set forth in claim 9 wherein the laminate has a total thickness of from about 3.0 to about 15.0 mils.

13. The bag set forth in claim 9 wherein the polymeric substrate of the core barrier metallized film comprises polyester.

14. The bag set forth in claim 13 wherein the core barrier metallized film further comprises a layer comprising polyethylene naphthalate.

15. The bag set forth in claim 9 wherein the metal comprises aluminum.

16. The bag set forth in claim 9 further comprising at least one lap seal.

17. The bag set forth in claim 9 further comprising gusset seals.

18. The bag set forth in claim 10 wherein the outer film comprises reverse printing on the surface adjacent the adhesive.

* * * * *